US005368929A

United States Patent [19]

Parker et al.

[11] Patent Number: 5,368,929

[45] Date of Patent: Nov. 29, 1994

[54] HIGH TEMPERATURE INSULATION FOR LIQUID-FILLED TRANSFORMERS

[76] Inventors: Paul E. Parker, R.R. 13, Box 49, Concord, N.H. 03301; Martin H. Fox, R.R. 1, Box 240R; Robert H. Turpin, 42 Thompson Park, both of Franklin, N.H. 03235; Thomas M. Golner, W227 N2242 Lakeview Dr., Pewaukee, Wis. 53072

[21] Appl. No.: 15,126

[22] Filed: Feb. 9, 1993

[51] Int. Cl.[5] ............................................ B32B 7/02

[52] U.S. Cl. ............................ 428/305.5; 428/304.4; 428/308.4; 428/311.1; 428/311.5; 428/313.7; 428/283; 428/284; 428/285; 428/286; 428/287; 428/288; 428/289; 428/290; 428/291

[58] Field of Search .............................. 428/283-291, 428/251, 304.4, 305.5, 308.4, 311.1, 311.5, 313.7; 336/57, 58

[56] References Cited

U.S. PATENT DOCUMENTS 4,410,585 10/1983 McLaughlin ...................... 428/215

*Primary Examiner*—Patrick J. Ryan
*Assistant Examiner*—Richard C. Weisberger
*Attorney, Agent, or Firm*—William B. Ritchie

[57] ABSTRACT

A high temperature insulation for liquid-filled transformers. This invention is a composite sheet material composed of a substrate saturated with a thermally stable polymeric resin that provides a micro-porous structure. This structure allows dielectric fluid to saturate the electrical insulation material. The insulation materials have a low moisture absorption, and do not generate water when aged during the life of the transformer. The invention improves transformer life expectancy with a cost effective alternate electrical sheet insulation material. This material has better heat aged electrical properties than cellulose, which is presently the most common insulator for liquid filled transformers.

6 Claims, 2 Drawing Sheets

HIGH TEMPERATURE INSULATION FOR LIQUID-FILLED TRANSFORMERS

BACKGROUND OF THE INVENTION

1. Field of the Invention

The invention relates to insulation for use in liquid filled transformers.

2. Description of the Related Art

Since the invention of the first transformers in the 1880's, cellulose paper has been used as the primary solid electrical sheet insulation in liquid-filled transformers. Cellulose has several shortcomings such as moisture absorption, water generation, and limited thermal capabilities. To overcome moisture absorption, the transformer must undergo a time consuming heat and vacuum process to remove the absorbed water, so that maximum dielectric strength can be obtained. Once the heat and vacuum process has been undertaken, the cellulose is typically impregnated with mineral oil to slow the absorption of moisture. The second problem, water generation, naturally occurs as cellulose ages due to heat. This results in reduced dielectric strength of the oil, and may eventually cause a transformer to fail. The major cause of transformer failures is the limited thermal capability of the cellulose insulation. Aging of the cellulose in liquid-filled transformers results in mechanical embrittlement and electrical deterioration of the insulation. For the reasons stated, there is a desire to extend the life of liquid-filled transformers.

An alternative to the cellulose insulation is the use of enamel insulation. This insulation employs an enamel coated wire, as opposed to paper insulated wire. The enamel types of insulation are sensitive to the cleaning of the substrate (either aluminum or copper) and may have pinholes or non-uniform build across the surface of the conductor that will lead to reduced dielectric performance.

Another type of insulation that has been studied recently is aramid paper. However, this type of insulation is considerably more costly than the standard cellulose type. Also, the aramid papers require a longer processing time to reach an acceptable moisture level.

prior art does not provide for a cost effective alternate electrical sheet insulation material that has better heat aged electrical properties than cellulose.

SUMMARY OF THE INVENTION

It is an object of the invention to provide a high temperature insulation for liquid-filled transformers that provides improved capabilities over presently used insulations.

It is another object of the invention to provide a high temperature insulation for liquid-filled transformers that maintains its mechanical and electrical properties after heat aging, thus prolonging the effective life of the transformer.

It is another object of the invention to provide a high temperature insulation for liquid-filled transformers that results in substantially improved overload capability for the electrical components.

It is another object of the invention to provide a high temperature insulation for liquid-filled transformers that does not exhibit embrittlement after heat aging 2000 hours at 130° C. whereas cellulose paper shows embrittlement after heat aging for 336 hours at the same temperature.

It is still another object of the invention to provide a high temperature insulation for liquid-filled transformers that will have improved long term mechanical stability compared to cellulose insulation.

It is still another object of the invention to provide a high temperature insulation for liquid-filled transformers that exhibits a lower dielectric constant and better partial discharge characteristics than conventional insulation systems when saturated with dielectric fluid, thereby improving the efficiency of the finished transformer by reducing the size of the insulation system.

It is still another object of the invention to provide a high temperature insulation for liquid-filled transformers that possesses a micro-porous structure that allows dielectric fluid to fully saturate the insulation material.

It is still another object of the invention to provide a high temperature insulation for liquid-filled transformers that provides sufficient porosity to be readily impregnated with a dielectric fluid to enhance its partial discharge performance and have a high barrier characteristic to enhance its performance for dielectric impulse strength.

It is still another object of the invention to provide a high temperature insulation for liquid-filled transformers that requires low compression set and provides consistent compressibility that will give greater support and enhanced resilience as compared to other insulation systems.

It is still another object of the invention to provide a high temperature insulation for liquid-filled transformers that provides adequate strength for conductor wrapping.

It is another object of the invention to provide a high temperature insulation for liquid-filled transformers that exhibits low moisture retention and generation characteristics; such that there will be no bubble evolution due to a high temperature that could be caused by short term overloading of a transformer.

It is another object of the invention to provide a high temperature insulation for liquid-filled transformers that contains a maximum of 0.7% water, while cellulose typically contains 3% water as received; whereas the object of this invention contains a maximum 0.7% water. It is anticipated that this difference will allow shorter manufacturer processing time to remove water from the transformer to an adequate moisture content using simpler vacuum equipment than would be needed for other types of insulation.

It is still another object of the invention to provide a high temperature insulation for liquid-filled transformers that exhibits a low power factor when saturated with dielectric fluid at elevated temperatures. The invention has a typical power factor of 4% measured at 130° C.; whereas kraft typically has a typical power factor of 45% measured at 130° C. These values were obtained after heat aging the insulations in transformer oil for two weeks at 130° C.

It is still another object of the invention to provide a high temperature insulation for liquid-filled transformers that does not significantly degrade the properties of the insulating fluid when the insulation and fluid are heat aged together.

It is a further object of the invention to provide a high temperature insulation for liquid-filled transformers that is inert in hot transformer oil in the presence of other materials of construction (i.e., copper and iron) thereby affecting the properties of the insulating fluid.

It is still another object of the invention to provide a high temperature insulation for liquid-filled transformers that is more cost effective than other high temperature insulation for liquid-filled transformers.

It is still another object of the invention to provide a high temperature insulation for liquid-filled transformers that can be applied using existing manufacturing equipment and procedures.

It is still another object of the invention to provide a high temperature insulation for liquid-filled transformers where the dielectric constant and high dielectric strength of the insulation system will allow reducing the electrical stress in the insulating fluid and increasing the stress in the solid insulation to take advantage of the improved dielectric properties of the solid insulation.

The invention is a high temperature insulation for liquid filled transformers. A thermally stable resin, is provided wherein said resin is saturated into a substrate and heat cured to produce a micro-porous composite.

DETAILED DESCRIPTION OF THE INVENTION

Figure 1:
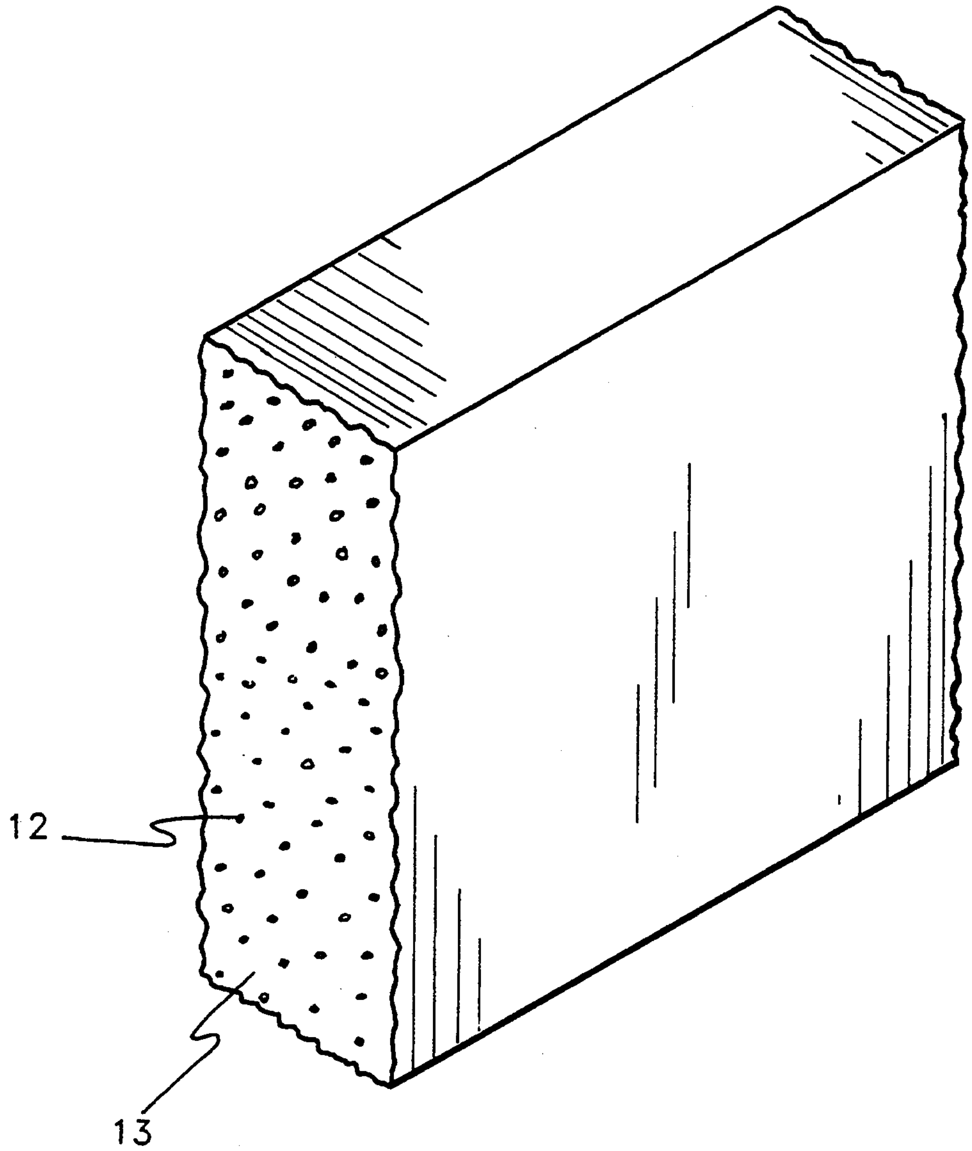
FIG. 1 is a cross sectional view of the high temperature transformer insulation.
Figure 2:
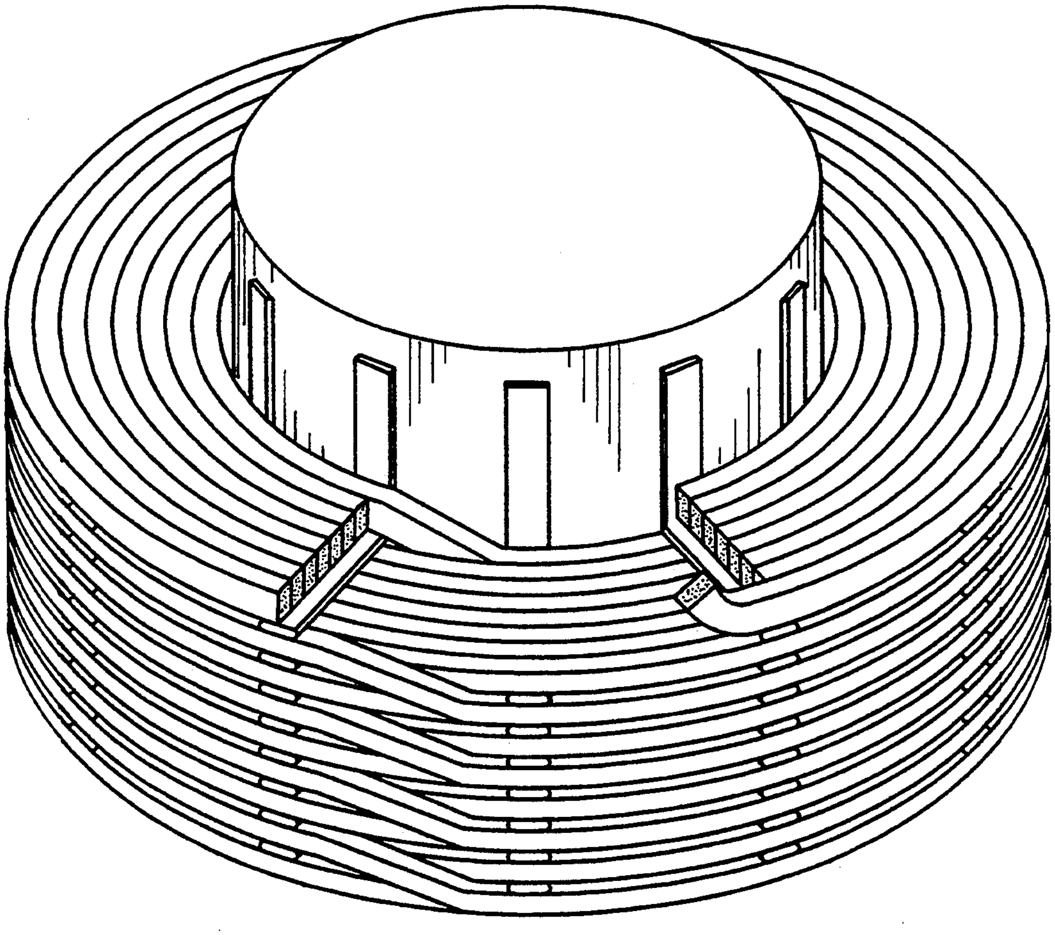
FIG. 2 is a cross sectional view of the high temperature transformer insulation wrapped around conductor windings of a transformer in accordance with the invention.

FIG. 1 is a cross sectional view of the high temperature transformer insulation. The composite sheet material shown in FIG. 1 is composed of substrate 12 and saturant 13.

Substrate 12 is preferably a non-woven high density thermally bonded polyester mat with a 0.0015–0.0040 inch thickness. The substrate provides some of the mechanical strength, porosity, electrical, and thermal properties necessary for the end products processing and performance capabilities. Other woven or non-woven substrates that achieve the required properties could also be used as substrate 12.

The substrate should have the following criteria: 1. The substrate should not degrade the electrical and physical properties of the transformer oil when heat aged at 130° C. 2. The substrate when saturated with resin must have adequate strength for the conductor wrapping operation. 3. The substrate should not generate water during heat aging in hot transformer oil. 4. The substrate's physical strength should not degrade when aged in hot transformer oil. 5. The substrate should have adequate porosity so that the saturant can wet into the interstices of the substrate. 6. The substrate should have limited porosity such that saturant does not drip out of the substrate. Criteria 5 and 6 are dependent on the viscosity of the saturant.

The saturant 13 is preferably a thermally stable polymeric resin that can provide a micro-porous structure when cured allowing dielectric fluid to saturate through the electrical insulation material. Thickness will vary depending upon specifications.

Other resin systems, such as, alkyd, epoxy, phenolic, polyamide imide, polyamide, vinyl polybutadiene, polyetherimide, polyester/polyamide, polyurethane, and silicone may also be suitable for saturant 13. The saturant resins should have the following criteria: 1. The saturant resin should not generate water when heat aged in transformer oil. 2. The saturant resin should provide adequate strength reinforcement to the substrate so that the product is suitable for conductor wrapping operation. 3. The saturant resin physical and electrical properties should not degrade in 130° C. transformer oil. 4. The saturant resin formulation must be capable of producing a micro-porous structure when cured.

The formulation for saturant 13 is designed to have a thin enough viscosity so that the desired amount of formulated resin is applied, and is also designed to have a fast cure rate suitable for production processing, preferably, the formulated resin should be capable of curing in one minute at 160° C. One method of applying the saturant is to immerse the substrate in the saturant and running the saturated substrate between two wiping rods to remove excess saturant. Other state of the art methods may also be used. The wet saturated substrate is then run through a heated tower to cure the resin and produce the micro-porosity. The saturated cured insulation material thickness may range from 0.002 inches to 0.005 inches which is the thickness for the complete insulation.

The function of the saturant 13 is to impregnate the voids of substrate 12, to provide additional mechanical, electrical, and thermal properties, and to provide a micro-porous structure so that dielectric fluid can penetrate through the material.

The materials used in substrate 12 and saturant 13 have low water absorption, i.e., maximum moisture content of 0.7%, and do not generate water when aged in the use of the transformer. The materials provide improved thermal capabilities to allow the use of this insulation system at temperatures as high as 180° C. depending upon the liquid dielectric. This is a substantial improvement over cellulose which can only be used to 130° C. while maintaining good electrical properties including dielectric strength, dielectric constant and power factor. This high temperature transformer insulation in accordance with the invention is expected to provide increased transformer life markedly.

EXAMPLES

Examples of components and their relationships appropriate for use in saturant are provided as follows:

| | Parts by weight | |
|---|---|---|
| 1. | Resin - CC-1105 | 100 |
| | diluent - diallyl phthalate | 0–40 |
| | curative - Lupersol 331 | 0–5 |
| | promoter - cobalt napthanate | 0–3 |
| | inorganic filler | 0–50 |
| 2 | Resin - Ricon 150 | 100 |
| | diluent - vinyl toluene | 0–50 |
| | curative - benzoyl peroxide | 0–5 |
| | promoter - cobalt napthanate | 0–3 |
| 3. | Resin - PDG 600VT | 100 |
| | diluent - vinyl toluene | 0–40 |
| | curative - benzoyl peroxide | 0–5 |
| | promoter - cobalt napthanate | 0–3 |
| 4. | Resin - PDG 981 | 100 |

Examples of components and their relationships appropriate for use in substrate are provided below.

| | | |
|---|---|---|
| 1. | Dry formed substrate | |
| | High Density Polyester Mat | 100 |
| 2. | Wet formed substrate | |
| | Evans Microglass 606 | 100 |
| | Owens-Corning Glass E-691 | 0–40 |

-continued

| | | |
|---|---|---|
| | Mini-Fibers 1.5 D ¼" polyester | 0–40 |
| | Goodyear Chemigum 260 | 0–20 |
| | Inorganic Filler | 0–100 |
| 3. | Spunbonded Polyester | |
| | Reemay Synergex Style L100 | 100 |

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A high temperature insulation for liquid filled transformers comprising:

a thermally stable resin saturant that is capable of withstanding being immersed in transformer oil for 2000 hours at 130° Celsius without degrading, that has a maximum moisture content of 0.7%, and that does not generate water when heat aged in transformer oil;

a fiber reinforced substrate, wherein said substrate is a base for said saturant, and said saturant is impregnated into the said substrate and is run through a heated tower to cure said resin saturant to form a micro-porous structure no greater than 0.005 inches thick.

2. The high temperature insulation in claim 1, wherein said substrate is a high density thermally bonded polyester mat having a density in the range of 0.7 to 0.9 grams per cubic centimeter.

3. The high temperature insulation in claim 1, wherein said substrate is a non-woven material.

4. The high temperature insulation in claim 1, wherein said substrate is a woven material.

5. The high temperature insulation in claim 1, wherein said saturant is a polymeric resin.

6. The high temperature insulation in claim 1, wherein said saturant further comprising an inorganic filler.

* * * * *